United States Patent [19]

Perr

[11] Patent Number: 4,909,197

[45] Date of Patent: Mar. 20, 1990

[54] CAM FOLLOWER ASSEMBLY WITH PINLESS ROLLER

[75] Inventor: Julius P. Perr, Columbus, Ind.

[73] Assignee: Cummins Engine Company, Inc., Columbus, Ind.

[21] Appl. No.: 394,668

[22] Filed: Aug. 16, 1989

[51] Int. Cl.[4] ............................ F01L 1/14; F01L 1/18
[52] U.S. Cl. .......................... 123/90.48; 123/90.39; 74/569
[58] Field of Search ............... 123/90.39, 90.41, 90.44, 123/90.47, 90.48, 90.50; 74/569

[56] References Cited

U.S. PATENT DOCUMENTS

| | | | |
|---|---|---|---|
| 1,565,223 | 12/1925 | Church | 123/90.5 |
| 2,508,557 | 5/1950 | Wood, Jr. | 74/569 |
| 3,089,472 | 5/1963 | Thompson | 123/90.5 |
| 3,822,683 | 7/1974 | Clouse | 123/90.5 |
| 4,094,279 | 6/1978 | Kueny | 123/90.51 |
| 4,204,814 | 5/1980 | Matzen | 74/569 |
| 4,326,484 | 4/1982 | Amrhein | 123/90.5 |
| 4,335,685 | 6/1982 | Clouse | 123/90.5 |
| 4,369,627 | 1/1983 | Kasting et al. | 123/52 M |
| 4,440,121 | 4/1984 | Clancy et al. | 123/90.39 |
| 4,628,874 | 12/1986 | Barlow | 123/90.39 |
| 4,697,473 | 10/1987 | Patel | 123/90.39 |

FOREIGN PATENT DOCUMENTS 2340074 2/1975 Fed. Rep. of Germany ... 123/90.48
1109378 4/1968 United Kingdom ............ 123/90.48

Primary Examiner—Charles J. Myhre
Assistant Examiner—Weilun Lo
Attorney, Agent, or Firm—Sixbey, Friedman, Leedom & Ferguson

[57] ABSTRACT

A cam follower assembly for mechanically connecting a cam on a camshaft to a push rod assembly is disclosed. The cam follower assembly includes a cam follower link rotatably mounted to a pivot at a first end. At a second end the cam follower link has a substantially semicylindrical recess having a thin axial wall formed at each end of the recess. The cam follower link contacts a push rod adjacent its second end on a surface opposite the surface having the substantially semicylindrical recess. A pinless roller is mounted within the substantially semicylindrical recess and is restrained from axial movement by the thin axial walls. The pinless roller is held in rolling contact with a corresponding cam by imposition by the link of restraining force directly on the cam engaging surface of the roller. The roller may include an annular groove to facilitate lubrication of the cam follower assembly.

13 Claims, 3 Drawing Sheets

CAM FOLLOWER ASSEMBLY WITH PINLESS ROLLER

TECHNICAL FIELD

The present invention relates to cam follower assemblies for use with valve trains and injection trains. More particularly, the present invention relates to cam follower assemblies using a pinless roller connection between the cam follower and the cam to increase the load carrying capacity and reduce stresses on the cam follower assembly.

BACKGROUND OF THE INVENTION

Internal combustion engine designers typically desire to minimize the outer dimensions of the engine consistent with achievement of other design objectives such as adequate strength and power characteristics. Thus, each cylinder is placed as close as possible to its adjacent cylinder and the various components that accompany each cylinder are also compactly arranged. In engines employing cam driven injectors, three separate cam follower assemblies are generally used for each cylinder and must be mounted to convert the rotational movement of corresponding cams into reciprocal movement of a corresponding intake valve, exhaust valve, or injector by means of associated drive trains. Because the cam follower assemblies and their associated mounting structures are subject to high stresses during engine operation, compromises must be made between achieving a rugged, high strength construction and maintaining the overall size within acceptable limits.

Even a simple cam follower assembly mounting scheme, such as illustrated in U.S. Pat. No. 4,326,484 to Amrhein, imposes size limitations on the amount of space within the engine which can be assigned to each cam follower. In particular, each cam follower assembly, designed in accordance with the Amshein '484 patent, includes a roller engaging a corresponding cam mounted on the camshaft and a tappet body mounted for reciprocal movement in the adjacent support structure of the engine block. The tappet body includes a pair of legs for receiving a pin extending through the center of the roller and passing into receiving bores in the legs of the tappet body and thus, the thrust forces imparted by the roller must be borne by the legs of the tappet. However, to accommodate the transmitted thrust, the legs and pin must have a relatively substantial axial dimension. In a like manner, the supporting structure surrounding each cam follower tappet body must be sufficiently strong to restrict the associated cam follower to its predetermined path of travel. To adequately perform this function, the surrounding structure must be allotted some of the available axial space thereby further restricting the axial distance which may be occupied by each roller.

Another type of cam follower design known to the prior art includes a link pivotally connected at one end to the engine block and provided at the other end with a pin mounted, cam engaging roller. An example of such a cam follower is disclosed in U.S. Pat. No. 4,369,627 but this type of design does not eliminate the length constraints imposed on the roller by the need to provide thrust conveying legs to receive the ends of the roller supporting pin.

It is also known in the art to use pinless rollers to transmit the force of a rotatable cam to a drive train in an internal combustion engine. Church U.S. Pat. No. 1,565,223 (element 21), Wood, Jr. U.S. Pat. No. 2,508,557 (element 4), Clouse U.S. Pat. No. 3,822,683 (element 32), and Metzen U.S. Pat. No. 4,204,814 (element 4) disclose pinless rollers used in cam followers or similar assemblies. However, these references do not suggest how pinless rollers can be used to reduce overall engine size.

Although the prior art is replete with various types of cam follower assemblies, heretofore there has not been an assembly that combines the beneficial features of a rotatable cam follower link with the advantages of a pinless roller to allow the rollers in a given set of cam followers serving each cylinder to occupy the maximum portion of the total axial length which may be assigned to the set of cam followers. None of the known assemblies uses a pinless roller and pivotal link to maximize the total force transmitting capacity of the assembly having a predetermined width while maintaining cam surface stresses within acceptable limits. None of the prior art discloses how a simple cam follower link combined with a pinless roller held in place by axial end walls can assist in achieving improved engine performance without increased size.

SUMMARY OF THE INVENTION

It is an object of the present invention to provide a cam follower assembly that helps to increase performance without increasing the size of the engine.

It is another object of the present invention to provide a system for driving the plurality of drive train assemblies associated with a cylinder of an expansible chamber device such as an internal combustion engine wherein a plurality of cam follower assemblies having rollers are driven by a common camshaft having cams mounted within a predetermined axial distance of the camshaft, and the cam follower assemblies are oriented to allow each roller to occupy substantially the maximum possible axial length within the predetermined axial distance of the camshaft.

Yet another object of the present invention is to provide a cam follower assembly including a cam follower link adapted to be pivotally connected at one end to the engine block assembly and including a pinless roller constrained at the other end of the pivoted link through direct contact between the pivoted link and the cam engaging surface of the roller whereby the length of the pinless roller may be maximized for a predetermined allowable width of the roller engaging end of the cam follower link.

Still another object of the present invention is to provide a cam follower assembly including a cam follower link that maximizes the transmitting capacity of the cam follower assembly for a predetermined dimension of the cam follower link in the axial direction of the camshaft.

Another object of the present invention is to provide a cam follower assembly including a cam follower link adapted to be pivotably connected at one end to the engine block assembly and including a pinless roller constrained at the other end of the pivoted link through direct contact between the pivoted link and the cam engaging surface of the roller whereby the width of the roller engaging end of the link may be minimized for a predetermined load carrying capacity.

It is another object of the present invention to provide a cam follower assembly including a cam follower link pivotally mounted at one end to the engine block wherein the link includes a receiving cavity for the pinless roller to form a roller constraining system for holding the roller in rolling contact with a corresponding cam mounted on the camshaft by imposing a restraining force directly on the cam egaging surface of the roller to allow the roller to occupy substantially the maximum possible axial length, and wherein the receiving cavity is formed with end walls whose thickness, in the axial direction of the associated camshaft, is sufficient to axially restrain the pinless roller buy may be insufficient to transmit the thrust load transmitted by the cam follower assembly to its associated drive train.

It is a further object of the present invention to provide a cam follower assembly including a cam follower link adapted to be pivotably connected at one end to the engine block assembly and having a substantially semi-cylindrical recess for receiving a pinless roller which contacts the cam wherein the link includes a pair of thin axial walls located at opposed ends of the recess which restrain the pinless roller from axial movement.

It is another object of the present invention to provide a cam follower assembly including a link adapted to be connected at one end to the engine block assembly and including a pinless roller which contacts the cam wherein the pinless roller includes an annular groove which facilitates lubrication of the cam follower assembly.

Still another object of the present invention is to provide a cam follower assembly according to the above objects wherein the length of the roller is at least 90% of the width, in the axial direction of the associated camshaft, of the end of the link housing the roller.

These and other objects are attained by the cam follower assembly of the present invention including a cam follower link pivotally mounted at first end and having a substantially semicylindrical recess adjacent a second end for receiving a pinless roller and having a thin axial wall formed at each end of the recess for axially restraining the roller. On a side opposite the roller, the cam follower link contacts a push rod which forms part of the drive train assembly for a valve or injector of the engine. The pinless roller preferably includes an annular groove to facilitate lubrication of the cam follower assembly. The length of the pinless roller may be increased over that of a pinned roller because the axial restraining walls need only be thick enough to restrain axial movement of the roller. This increases the load carrying capacity and reduces stresses on the cam follower assembly as compared with other types of cam followers having the same overall width. Alternatively, the present design permits the cam follower link to be formed more narrowly for a given application to conserve space while maintaining a predetermined load carrying capacity and without exceeding a predetermined Hertz stress limitation. Thus, the total width required for the cam follower assemblies associated with a single cylinder is minimized.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIGS. 4a and 4b compare the pinless roller of the cam follower assembly of FIG. 3 with a prior art pinned roller wherein FIG. 4a is a sectional view taken along line 4—4 of FIG. 3 and FIG. 4b is a similar view of a prior art pinned roller.

DETAILED DESCRIPTION OF PREFERRED EMBODIMENTS

Figure 1:
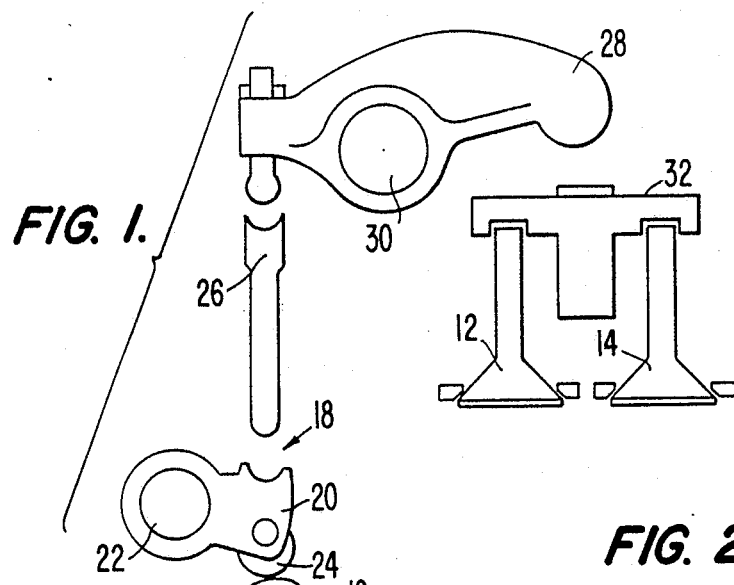
FIG. 1 is a schematic view of a drive train assembly for internal combustion engine valves which may incorporate a cam follower assembly designed in accordance with the subject invention.
Figure 2:
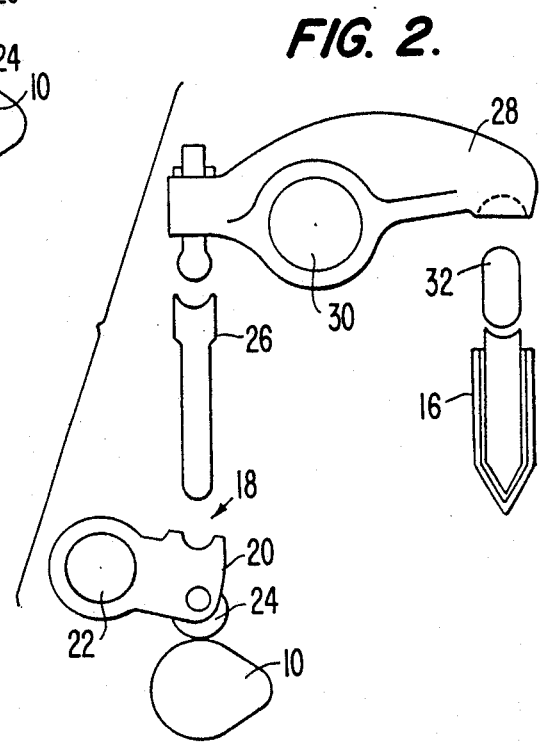
FIG. 2 is a schematic view of a drive train assembly for an internal combustion engine fuel injector which may incorporate the subject invention.

Referring first to FIG. 1 and 2, the general elements of a drive train assembly including a cam follower assembly which may be designed in accordance with the subject invention are shown schematically. The invention may be applied to an in-line multicylinder diesel engine, but it should be understood that the principles of the invention may also be applied to other engine types. The drive assembly is actuated by a cam 10, mounted on a rotatable camshaft (not shown), and drives valves 12 and 14 (FIG. 1), or a fuel injector 16 (FIG. 2). The drive assembly includes a cam follower assembly 18 including cam follower link 20 pivotally mounted on pivot 22. Pinless roller 24 is in rolling contact with the surface of cam 10 to cause the cam follower link 20 to convert the rotational motion of the cam into translational motion of push rod 26 although any type of drive train may be used in conjunction with or instead of a push rod. Push rod 26 in turn rotates rocker arm 28 around rocker shaft 30 which imparts translational motion to cross head 32 for operating valves 12, 14 (FIG. 1) or to push tube 32 to operate fuel injector 16.

An internal combustion engine normally includes an engine block for housing various engine components such as the valve and fuel injector drive train assemblies and is very crowded. Each engine includes a plurality of engine cylinders and each cylinder typically requires at least one intake valve, at least one exhaust valve, and a fuel injector (when the engine is equipped with a unit fuel injector system), thus requiring three drive train assemblies per engine cylinder. Because each drive train assembly is actuated by a separate cam, each cylinder requires three cams, typically mounted on a single camshaft. The camshaft is positioned adjacent the engine cylinders so that the cams are mounted on the camshaft within a limited, predetermined axial distance along the camshaft. The injector and the valves of each cylinder are operated in synchronism with the other operating parts of the engine by a camshaft 34 that is geared to the engine crankshaft. Because of the length of the camshaft, it must be supported on bearings disposed between adjacent cylinders throughout the engine to prevent bowing. These supports further restrict the size of the cams and further crowd the available space within the engine block. Thus, in accordance with this invention, a plurality of cam follower assemblies are designed to permit the maximum possible axial length to be occupied by each cam engaging roller.

Figure 3:
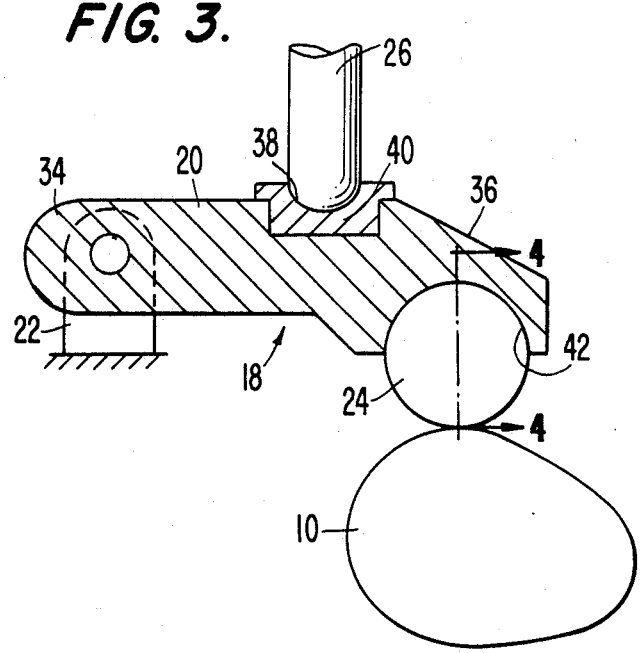
FIG. 3 is a side elevational view of the cam follower assembly of the present invention.
Figure 5:
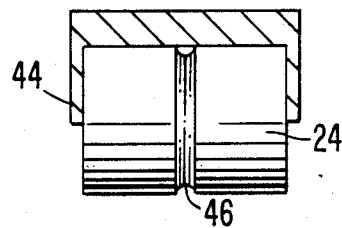
FIG. 5 is a view similar to FIG. 4a showing an embodiment of the pinless roller having an annular lubrication groove.

Referring to FIG. 3, the cam follower assembly of the present invention will be explained in detail. Cam follower assembly 18 contacts cam 10 to convert rotational movement of the cam into reciprocating motion of push rod 26 of a drive train assembly. Cam follower link 20 contacts and transmits lifting load from cam 10 to push rod 26, and includes first end 34 rotatably mounted on pivot 22 and second end 36 in which is retained cam contacting roller 24. By pivoting cam follower link 20, any supporting structure surrounding the cam follower in the vicinity of the roller can be removed, thereby increasing the potential length of the roller, improving upon devices such as those of the '484 patent. Push rod recess 38 is formed adjacent second end 36 and may include a wear resistant insert 40 having a recess disposed in cam follower link 20. On the opposite side of link 20 from that of insert 38 is a semicylindrical recess 42 bounded on each end by two thin axial end walls 44 which, in combination with the semicylindrical surface of the recess, hold pinless roller 24 in position within semicylindrical recess 42. The restraining force imposed on roller 24 is imposed directly on the cam engaging surface of the roller by the link surfaces forming the semicylindrical recess. Pinless roller 24 connects cam follower link 20 to cam 10 and the thrust exerted by cam 10 directly to pinless roller 24 is transmitted through cam follower link 20 to push rod 26 of the drive assembly without assistance from axial end walls 44 which serve only to retain pinless roller 24 within semicylindrical recess 42. As shown in FIG. 5, pinless roller 24 may have one or more annular grooves 46 to facilitate lubrication of cam follower assembly 18.

Figure 4A:
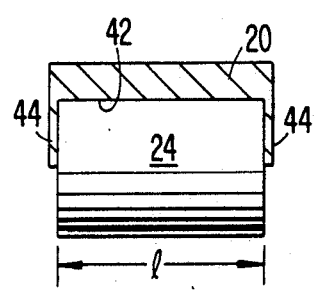
Figure 4B:
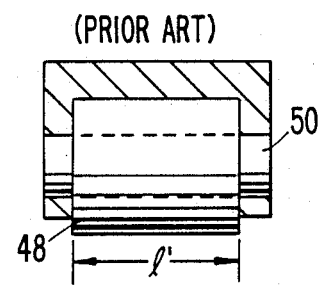

FIG. 4 shows a comparison of pinless roller 24 with a conventional pinned roller 48 requiring pin 50 to hold roller 48 within semicylindrical recess 42. FIG. 4a is a sectional end view of a translational pinned cam follower assembly and FIG. 4b is a similar view of a prior pivoted, linked, pinned cam follower assembly. The outside widths of both cam follower links 20 are identical. However, as seen in FIG. 4b, the thickness of axial end walls 44 must be enlarged to accommodate the ends of pin 50. These axial end walls 44 also must be enlarged to transmit loads from the cam to the push rod. This reduces the maximum length of both semicylindrical recess 42 and pinned roller 48. In contradistinction, pinless roller 24 of the present invention may be significantly longer and is maximized because the thickness of axial end walls 44 are minimized and the length of semicylindrical recess 42 is correspondingly maximized. By lengthening pinless roller 24, the cams which contact the roller can be formed wider, thereby taking advantage of heretofore wasted space in the engine block and allowing increased thrust forces to be transmitted by the cams thereby augmenting the performance capabilities of the drive trains and the performance of the engine without increasing its overall size. As is well known, even slight improvements in performance, accomplished without increasing engine size, are large advances in the design of internal combustion engines.

As shown in FIG. 4, the length of pinless roller 24 is 1, and the length of pinned roller 48 is 1'. Axial end walls 44 of the present invention are not required to transmit loads. Nor are they required to receive pins. Axial end walls 44 only need be sufficiently thick to hold pinless roller 24 in position. Thus, pinless roller 24 may extend over 90% of the width of the second end 36 of cam follower link 20. Pinless roller 24 therefore may be 27% longer than pinned roller 48 when each is used in a cam follower link 20 having the same width. This increases the load carrying capability of cam follower assembly 18 and reduces the stresses on the cam follower assembly while operating within a predetermined limited width constraint for a specific valve or injector train configuration. Therefore, the plurality of cam followers that are typically used in a valve train or injector train may be improved in two ways. The cam followers may be positioned more closely together to save space within the engine compartment. Alternately, the cam followers may maintain their conventional spacing but may provide increased load carrying capacity while operating at or below the same stress concentrations.

Figure 6A:
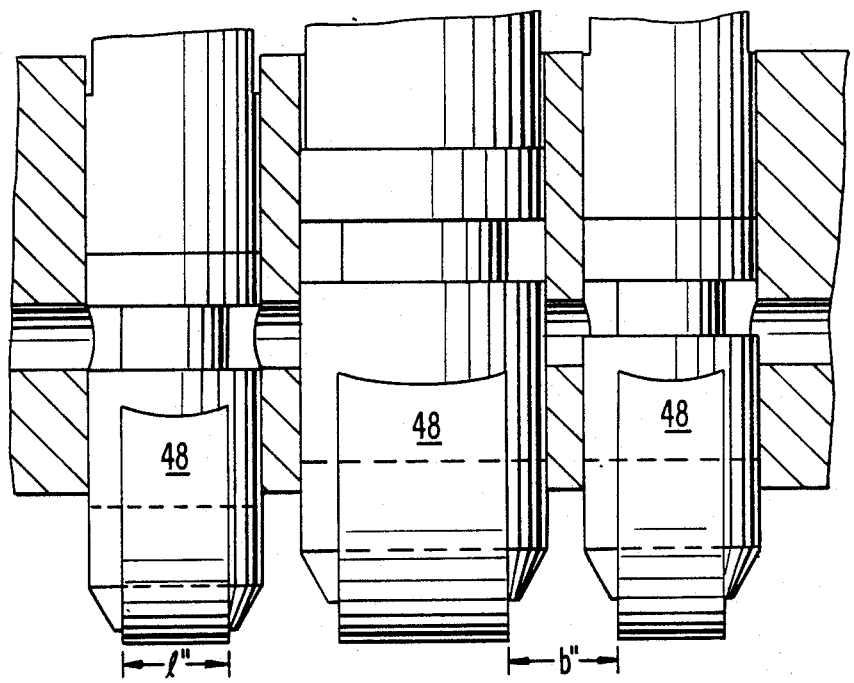
FIGS. 6a, 6b, and 6c compare a prior art translational pinned roller, cam follower assembly illustrated in FIG. 6a, a prior art pivoted link, pinned roller cam follower assembly illustrated in FIG. 6b; and a pivoted pinless cam follower assembly according to the present invention illustrated in FIG. 6c.
Figure 6B:
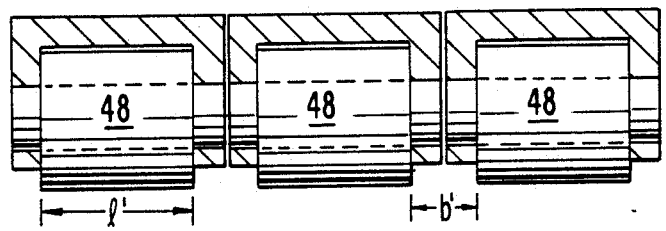
Figure 6C:
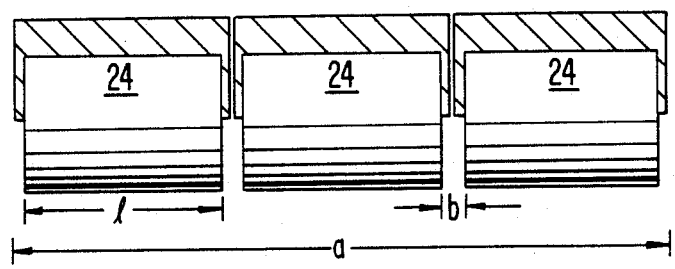

Furthermore, reference to FIG. 6 reveals the substantial improvement of the present invention over prior art pivotable cam follower links using pinned rollers and prior art translatable cam follower links using pinned rollers. FIG. 6 compares the lengths and usable cam lengths of a translatable cam follower with pinned rollers 48 (FIG. 6a), a pivoted cam follower link with pinned rollers 48 (FIG. 6b), and the present invention's rotatable cam follower link with pinless rollers 24 (FIG. 6c). Three rollers are shown side-by-side to illustrate the configuration for intake valves, exhaust valves, and a fuel injector, and to best illustrate the magnitude of improvement. For a given total length "a" between the left end of the left cam follower link and the right end of the right cam follower link, the cam length "1" is an important criterion.

In the pivoted link type cam follower assembly shown in FIG. 6b, space savings are achieved over the systems such as those in the '484 patent. The pivotal link system uses a pivotal cam follower link rotatable around a pivot at one end. As can be seen in FIG. 6b, the distance between the forked end walls of adjacent cam follower links is reduced. The distance is less than that between the forked end walls of the adjacent tappets of the pinned, nonpivotal system shown in FIG. 6a. This increases the total length 1' of the rollers, thereby increasing the length of the cams to approximately 70% of the total available length "a." This is an increase of 26% over the length of the nonpivotal system in which the length "1" of the roller causes the length of the cams to be only approximately 58% of the total available length "a." However, this still leaves 27% of the total length "a" unused.

The present invention improves upon both systems. The length 1 in the present invention is 26% greater than that of the system of FIG. 6b and is 59% greater than the system of FIG. 6a. Thus, where the translatable system of FIG. 6a uses only 58% of the total length "a" for its cams, and the FIG. 6b system uses 73%, the present invention uses approximately 90%. As seen in FIG. 6c, this represents virtually the maximum possible length for rollers 24 and therefore cams 10 without changing materials. In practical terms, axial end walls 44 could not be made any thinner than in the present invention, and rollers 24 and cams 10 cannot be made any longer. The present invention maximizes the total possible cam length and thereby maximizes the load carrying capacity of the system without enlarging the engine.

Thus, the cam follower assembly 18 of the present invention incorporates both the features of a rotatable cam follower link with the advantages of a pinless roller. Pinless roller 24 maximizes the load capacity and minimizes the stresses on the assembly for a rotatable cam follower link 20 having a predetermined width. The length of pinless roller 24 is also maximized, while the thickness of axial end walls 44 of recess 42 in the cam follower link which receives pinless roller 24 are minimized. Axial end walls 44 do not transmit load from the cam to the push rod and do not receive pins. Also, cam follower assembly 18 can have a minimum cam contacting portion width for a predetermined load carrying capacity.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

INDUSTRIAL APPLICABILITY

The cam follower assembly using a pinless roller of the present invention increases the load carrying capacity while reducing stresses in the assembly for a given cam follower link width. The cam follower assembly finds application with the valve and injector trains of expansible chamber devices such as internal combustion engines. This design is particularly suitable for small engines used with automotive vehicles as well as stationary power plants, where engine size is a critical consideration.

I claim:

1. A cam follower system for converting the rotational movement of a plurality of cams mounted within a predetermined axial distance along a common camshaft into reciprocating movement of the ends of a corresponding number of drive trains, respectively, wherein all of the drive trains are operatively associated with a single cylinder mounted adjacent the common camshaft, said cam follower system comprising:
   a plurality of rollers corresponding in number to the number of drive trains associated with the single cylinder; and
   roller constraining means for holding each said roller in rolling contact with a corresponding cam mounted on the camshaft by imposing a restraining force directly on the cam engaging surface of each said roller to allow each said roller to occupy substantially the maximum possible axial length within the predetermined axial distance, said roller constraining means including a plurality of links engaging the ends of the respective drive trains, each said link being pivotally mounted adjacent a first end, and having a roller receiving cavity adjacent a second end for receiving said roller.

2. The cam follower system according to claim 1 wherein each said link includes a pair of thin axial walls located at opposed ends of said receiving cavity, said walls having sufficient thickness in the axial direction of the camshaft to axially constrain said respective roller without transmitting thrust load from the cam to its associated drive train.

3. The cam follower system according to claim 2 wherein said walls have insufficient thickness to transmit the thrust load from the cam to its associated drive train.

4. A cam follower assembly for converting the rotation of a cam on a camshaft into reciprocating movement of a drive train, said cam follower assembly comprising:
   a roller engaged in rolling contact with a corresponding cam roller;
   constraining means for holding said roller in rolling contact with a corresponding cam mounted on the camshaft by imposing a restraining force directly on the cam engaging surface of said roller to allow said roller to occupy substantially the maximum possible axial length within a predetermined width in the axial direction of the camshaft wherein said roller constraining means comprises a cam follower link engaging the end of the drive train and being pivotally mounted adjacent a first end and having a roller receiving cavity adjacent a second end, whereby the load carrying capacity of said cam follower assembly may be increased without requiring increased roller surface and cam surface stresses.

5. The cam follower assembly according to claim 4 wherein said second end of said cam follower link has a substantially semicylindrical recess for receiving said roller and said cam follower link includes a pair of thin axial walls located at opposed ends of said semicylindrical recess to axially constrain said roller without transmitting thrust load from the cam to the drive train.

6. The cam follower assembly according to claim 5 wherein said walls have insufficient thickness to transmit the thrust load from the cam to the drive train.

7. The cam follower assembly according to claim 5 wherein the width, in the axial direction of the camshaft, of the second end of said cam follower link is limited to the axial length of said roller plus the thickness of said thin axial walls.

8. The cam follower assembly according to claim 7 wherein the central axis of said substantially semicylindrical recess is substantially parallel to the central axis of said cam follower link.

9. The cam follower assembly according to claim 4 wherein said cam follower link is adapted to between said first and second ends.

10. The cam follower assembly according to claim 4 wherein said roller comprises an annular groove to facilitate lubrication of said cam follower assembly.

11. The cam follower assembly according to claim 4 wherein said cam follower link comprises a recess for receiving a push rod of the drive train assembly.

12. The cam follower assembly according to claim 4 wherein said second end of said cam follower link has a substantially semicylindrical recess for receiving said roller, and said cam follower link includes a pair of thin axial walls located at opposed ends of said semicylindrical recess to axially constrain said roller, whereby the length of said pinless roller is at least 90% of the width, in the axial direction of the camshaft, of said cam follower link at said second end.

13. The cam follower assembly according to claim 5 wherein said second end of said cam follower link has a substantially semicylindrical recess for receiving said roller and said cam follower link includes a pair of thin axial walls located at opposite ends of said semicylindrical recess to constrain said roller, and wherein when said cam follower assembly is disposed adjacent two additional cam follower assemblies to operate intake valves, exhaust valves, and a unit fuel injector for an engine cylinder the total length of said three pinless rollers is at least 90% of the total width, in the axial direction of the camshaft, between the left end of the leftmost cam follower link and the right end of the rightmost cam follower link, at the second ends of said cam follower links.

* * * * *